United States Patent [19]

Rashleigh

[11] Patent Number: 4,495,411
[45] Date of Patent: Jan. 22, 1985

[54] FIBER OPTIC SENSORS OPERATING AT DC
[75] Inventor: Scott C. Rashleigh, Alexandria, Va.
[73] Assignee: The United States of America as represented by the Secretary of the Navy, Washington, D.C.
[21] Appl. No.: 437,098
[22] Filed: Oct. 27, 1982
[51] Int. Cl.$^3$ .............................................. G01D 5/34
[52] U.S. Cl. ................................ 250/227; 250/231 R
[58] Field of Search ............ 356/351; 250/227, 231 R, 250/225; 73/657; 358/112, 901; 324/96

[56] References Cited

U.S. PATENT DOCUMENTS

| | | | |
|---|---|---|---|
| 3,591,254 | 7/1971 | Browne | 350/149 |
| 3,605,013 | 9/1971 | Yoshikawa | 324/96 |
| 3,693,082 | 9/1972 | Jaecklin | 324/96 |
| 3,786,681 | 1/1974 | Kiehn | 73/382 |
| 3,950,987 | 4/1976 | Slezinger et al. | 73/141 A |
| 4,070,620 | 1/1978 | Feldtkeller et al. | 324/96 |
| 4,111,050 | 9/1978 | Waddoups | 250/225 |
| 4,162,397 | 7/1979 | Bucaro et al. | 250/199 |
| 4,173,412 | 11/1979 | Ramsay et al. | 356/33 |
| 4,295,738 | 10/1981 | Meltz et al. | 356/32 |
| 4,363,114 | 12/1982 | Bucaro et al. | 73/657 |
| 4,433,915 | 2/1984 | Hanse | 356/351 |
| 4,442,350 | 4/1984 | Rashleigh | 250/227 |
| 4,450,406 | 5/1984 | Bobb | 250/227 |
| 4,468,090 | 8/1984 | Ulrich et al. | 356/351 |

OTHER PUBLICATIONS

Ulrich, Rashleigh, Eickhoff, "Bending-Induced Birefringence in Single-Mode Fibers" Optical Letters, Jun. 1980, vol. 5, No. 6, pp. 273–275.
Ulrich, "Polarization Stabilization on Single-Mode Fiber".
Appl. Phys. Lett. 35 (11); Dec. 1, 1979; pp. 840–842.
Kaminow, Simpson, Presby, "Strain Birefringence in Single-Polarisation Germanosilicate Optical Fibres" Electronics Letters; vol. 15, No. 21; Oct. 11, 1979, pp. 677–679.
Rashleigh, Ulrich, "Magneto-Optic Current Sensing with Birefringent Fibers" Appl. Phys. Lett. 34 (11), Jun. 1, 1979, pp. 768–770.
Layton, Bucaro, "Optical Fiber Acoustic Sensor Utilizing Mode-Mode Interference" Applied Optics, vol. 18, No. 5, Mar. 1, 1979, pp. 666–668.
Stolen, Ramaswamy, Kaiser, Pleibel, "Linear Polarization in Birefringent Single-Mode Fibers" Appl. Phys. Lett. 33 (8), Oct. 15, 1978, pp. 699–701.
Simon, Ulrich, "Evolution of Polarization Along a Single-Mode Fiber" Applied Phys. Lett. vol. 31, No. 8, Oct. 15, 1977, pp. 517–519.
Papp, Harms, "Polarization Optics of Liquid-Core Optical Fibers" Applied Optics, vol. 16, No. 5, May 1977, pp. 1315–1319.
Papp, Harms, "Polarization Optics of Index-Gradient Optical Waveguide Fibers" Applied Optics, vol. 14, No. 10, Oct. 1975, pp. 2406–2411.
Kapron, Borrelli, Keck, "Birefringence in Dielectric Optical Waveguides" IEEE Journal of Quantum Electronics, vol. QE-8, No. 2, Feb. 1972, pp. 222–223.
Dyott, Stern, "Group Delay in Glass-Fibre Waveguide" Electronics Lett., vol. 7, No. 3, Feb. 11, 1971, pp. 82–84.

Primary Examiner—David C. Nelms
Assistant Examiner—Jere J. Brophy
Attorney, Agent, or Firm—Robert F. Beers; William T. Ellis; John L. Forrest

[57] ABSTRACT

A fiber optic sensor for detecting and/or measuring a physical quantity varying at any frequency from a maximum desired frequency down to zero frequency with minimum disturbance from environmentally induced perturbations. A first highly birefringent optical fiber is positioned longitudinally adjacent to a second equally birefringent fiber. Each fiber has orthogonally disposed fast and slow axes. The fibers are oriented such that their fast axes are perpendicular to each other. When subjected to stress caused by a physical quantity acting on the fibers through a transducer, the birefringence of each of the two fibers is asymmetrical altered thereby rotating the states of polarization of coherent light signals passing through the two fibers in a common direction. Environmental perturbations symmetrically alter the birefringence of each of the fibers thereby rotating the states of polarization of the light signals in opposite directions. The states of polarization of the light signals emanating from the two fibers are detected and combined such that the changes due to the physical quantity enhance each other while the changes due to environmental perturbations are cancelled.

25 Claims, 13 Drawing Figures

FIBER OPTIC SENSORS OPERATING AT DC

BACKGROUND OF THE INVENTION

1. Field of the Invention

The present Invention relates, in general, to novel fiber optic sensors and, more particularly, to novel fiber optic sensors which are capable of detecting and/or measuring slowly varying physical quantities for all frequencies from a maximum desired frequency down to zero frequency (DC).

2. Description of the Prior Art

Numerous fiber optic sensors have been developed in the recent past. The more common of these sensors consist of some variation of a two-fiber Mach-Zehnder interferometer. FIG. 1 illustrates a typical interferometer-type sensor for detecting a physical quantity to be measured, such as an acoustic pressure field occuring in a fluid medium. In this type of sensor two optical fibers are provided for establishing separate optical paths of substantially the same length—one defining a detection arm, exposed to acoustic waves, and the other defining a reference arm, isolated from the acoustic waves. Laser light is coupled equally into these arms and propagates therethrough to detectors which provide intensity readings $I_1$ and $I_2$. In the absence of acoustic pressure on the detection arm, the two modes propagate through the arms and arrive at the output coupler with a fixed phase difference between them. After being combined in the output coupler and interfering, they produce constant intensities $I_1$, $I_2$ on the detectors. However, when subjected to the pressures of an acoustic field, the optical fiber of the detection arm undergoes physical changes (length, diameter and index of refraction changes) which causes a phase delay relative to the mode propagating through the reference arm. When the modes are recombined and interfered, this relative phase shift causes the amplitude of the signals given by the detectors $I_1$ and $I_2$ to be changed by a detectable amount. This provides an indication of the magnitude of the acoustic source.

The state of polarization (SOP) of the light emerging from each fiber arm must be correct, and remain so, or the two modes will not completely interfere. Currently available single-mode fibers cannot maintain a specified state of polarization and, as the states of polarization in the fibers change, fringe visibility may fall to zero.

U.S. Pat. No. 4,162,397 issued July 24, 1979 to Joseph A. Bucaro et al. titled "Fiber Optic Acoustic Sensor" discloses a two fiber acoustic sensor wherein acoustic incident on a fiber coil changes its index of refraction at the region of incidence. The index change causes a phase shift in the transmitted light which is detectable to denote the presence of sound waves.

The two-fiber interferometer arrangement is very sensitive to changes in environmental conditions, such as temperature, pressure, air currents, for example, which also introduce phase changes in the propagating light. Because the two fiber arms are physically separate, differential environmental conditions face each and seriously affect the interferometer stability. Also, these environmental perturbations tend to swamp out the desired signal. To overcome these problems, active feedback compensation systems, as illustrated in FIG. 1, have been developed. These compensation systems are based on the principle that environmentally-induced instabilities are low frequency variations. As such, these compensated fiber optic sensors can only detect physical quantities which alternate above a certain predetermined frequency, typically above 100 Hz. Any variations below this frequency are considered to be due to environmental perturbations and hence are compensated out.

The above interferometer can be arranged such that both light paths propagate within the same fiber which may be either multimode or support only a few modes. In this case, the field condition changes the phase of all the propagating modes which interfere to produce a complex interference pattern at the fiber output. Probing this pattern with a suitable aperatured detector gives a signal proportional to the magnitude of the magnetic or acoustic field condition. Unfortunately, this approach is wasteful of light as only a portion of the transmitted light can be utilized If selective excitation at the input is used to excite only two modes of the fiber, then mode conversions due to imperfections can lead to problems. The single fiber interferometer has one advantage in that it does not require beamsplitting devices.

These simpler, single fiber sensors are much less susceptible to environmental perturbations as the light travels in only one fiber instead of two physically-separate fibers. With appropriate design, these sensors can have sensitivities close to those of the two-fiber sensors, leading to higher signal-to-noise ratios. These sensors can detect all the physical quantities that the two-fiber sensor can. However, these sensors still suffer from environmentally-induced instabilities, though less severe than the two-fiber sensor. Provided that the physical quantity is alternating, not necessarily above a certain frequency but different from the environmental instabilities, these sensors can be operated passively free of the environmental instability problems. That is, no active feedback compensation system is required.

Apart from the active, compensated two-fiber sensor which operates above a certain frequency and the passive single-fiber sensor which operates for frequencies different from the environmental instabilities, there is still a great need to detect physical quantities which change at low or zero frequency. For example, accelerations of aircraft rarely change sinusoidally. Constant accelerations are of major importance, as are a number of other constant physical quantities. In short, it is highly desirable that the very high sensitivity of fiber-optic sensors can be exploited at zero frequency, i.e., DC.

SUMMARY OF THE INVENTION

Accordingly, one object of the present Invention is to provide a novel fiber optic sensor for detecting a physical quantity.

Another object is to provide a novel fiber optic sensor which is capable of detecting and/or measuring slowly varying physical quantities.

Still another object is to provide a novel fiber optic sensor which is capable of detecting and/or measuring physical quantities varying at all frequencies from a maximum desired frequency down to zero frequency (DC).

Yet another object is to provide a novel fiber optic sensor for detecting and/or measuring a slowly varying physical quantity at any frequency from a maximun frequency down to zero frequency with minimum disturbance from undesired environmental perturbations.

These and other objects and advantages are achieved by a novel method according to the present Invention for detecting a physical quantity varying at any rate below a maximum rate with minimal disturbance from environmentally induced perturbations. In this method, first and second equally highly birefringent optical fibers are provided with each fiber having orthogonally disposed fast and slow axes. The first fiber is positioned longitudinally adjacent to the second fiber with the fast axis of the first fiber oriented orthogonal to the fast axis of the second fiber. First and second linearly polarized light signals are launched, respectively, into the first and second fibers. A physical quantity is allowed to asymmetrically stress the first and second fibers to alter the birefringence of each of the first and second fibers in response to the physical quantity. The states of polarization of the first and second light signals are thereby rotated in the same direction in response to the physical quantity. The first and second fibers are symmetrically stressed by environmental perturbations such that the states of polarization of the first and second light signals are rotated in opposite directions in response to the environmental perturbations. The states of polarization of the first and second light signals emanating from the first and second fibers, respectively, are detected. Finally, the detected states of polarization are combined such that the changes in the states of polarization due to the physical quantity add while the changes due to the environmental perturbations are cancelled.

These and other objects and advantages are achieved by a novel physical sensor device according to the present Invention for detecting a physical quantity varying at any rate below a maximum rate with minimum disturbance due to environmentally induced perturbations. The device includes a first highly birefringent optical fiber having orthogonal fast and slow axes. A first coherent light signal is conducted by the first fiber. A second coherent light signal is conducted by a second highly birefringent optical fiber having orthogonal fast and slow axes. The first and second fibers are equally birefringent. The first fiber is positoned longitudinally adJacent to the second fiber such that the fast axis of the first fiber is orthogonal to the fast axis of the second fiber. A coupling device is mechanically coupled to the first and second fibers to asymmetrical alter the birefringence of each of the fibers in response to a physical quantity thereby rotating the states of polarization of the first and second light signals in the same direction in response thereto. The birefringence of each of the first and second fibers is symmetically altered in response to environmental perturbations thereby rotating the states of polarization of the first and second light signals in different directions in response to the environmental perturbations. A detection means detects the states of polarization of the first and second light signals and combines the detected states such that the changes due to the physical quantity are added together while the changes due to the environmental perturbations are cancelled. An output signal is produced representative of the physical quantity.

BRIEF DESCRIPTION OF THE DRAWINGS

A more complete appreciation of the present Invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Before describing the present Invention in detail, background discussion will be provided regarding the nature and condition of the optical fibers used in the present Invention.

Real single mode optical fibers cannot propagate any arbitrary state of polarization (SOP) unchanged, even in the absence of environmental perturbations. This is because a real single mode optical fiber actually has two eigenstates or modes which are orthogonally polarized. Imperfections in the fiber cause the eigenmodes to be non-degenerate, and the fiber exhibits a linear birefringence $\beta_i = \Delta k_i$ where $\Delta k_i$ is the difference between the propagation constants of the two modes. In general, the orientation of the two eigenmodes is determined by the optical fiber core shape and stresses within the fiber. For example, an optical fiber having an elliptical cross section, or a round cross section subjected to asymmetrical stresses, exhibits such birefringence.

When a single mode optical fiber is bent into a coil such as around a cylinder, an additional linear birefringence $\beta_b + \beta_{tc}$ (due to bending and tension-coiling) is introduced into the fiber and the eigenmodes of this birefringence are linearly polarized parallel and perpendicular to the axis of the bending. For a freely bent fiber $\beta_b = \Delta k_b = aC^2 A^2$ where $\Delta k_b$ is the difference between the propagation constants of the two modes, C is the curvature of the bend of radius R (C=1/R), A is the fiber outside radius, and a is a material constant ($a = 1.34 \times 10^6$ rad/meter at a wavelength of 633 nanometers). If the bending radius R is sufficiently small, the optical fiber is made strongly birefringent, and polarized light launched into one of the eigenmodes propagates without coupling to the other eigenmode, even when the fiber is moderately perturbed, such as by an acoustic pressure. Bending the fiber under tension introduces an additional birefringence $\beta_{tc} = \Delta k_{tc} = b\epsilon CA$ where $\Delta k_{tc}$ is the difference between the propagation constants of the two modes, $\epsilon$ is the longitudinal strain (relative elongation) in the fiber and b is a material constant ($b = 4.9 \times 10^6$ at a wavelength of 633 nanometers). C and A have been defined above. This $\beta_{tc}$ makes the fiber even more strongly birefringent. When $\beta_b + \beta_{tc} << \beta_i$, the influence of $\beta_i$ is negligible and only $\beta_b + \beta_{tc}$ need be considered.

Figure 1:
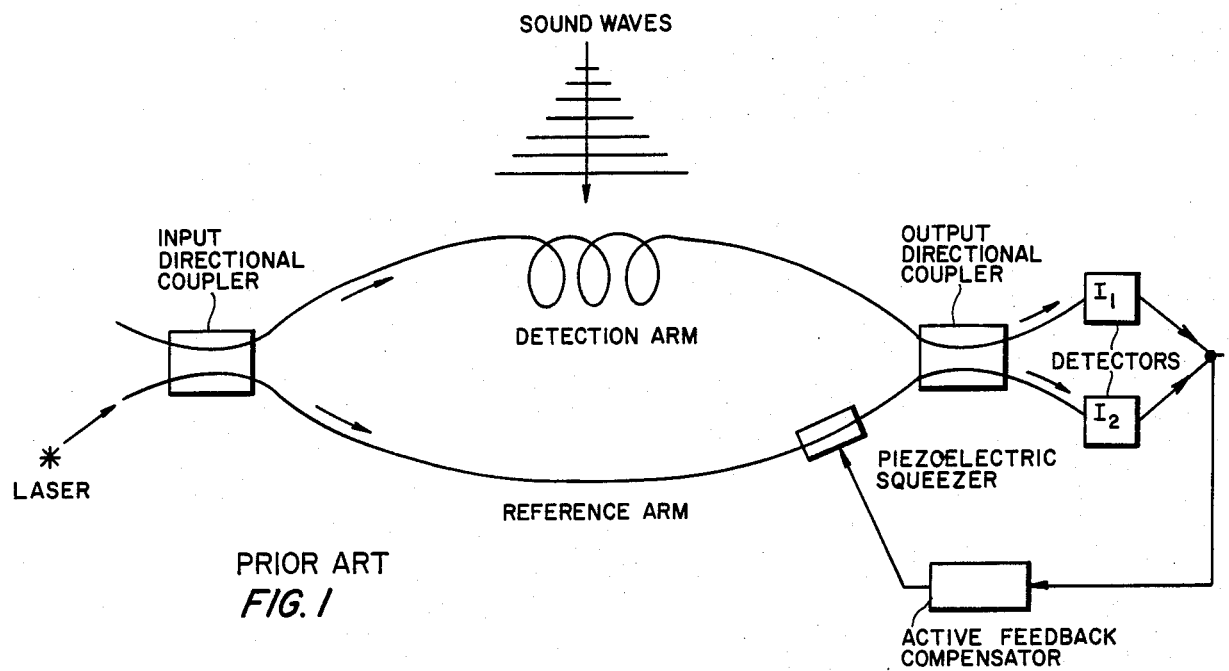
FIG. 1 illustrates a prior art interferometric sensor for detecting a physical quantity.
Figure 2:
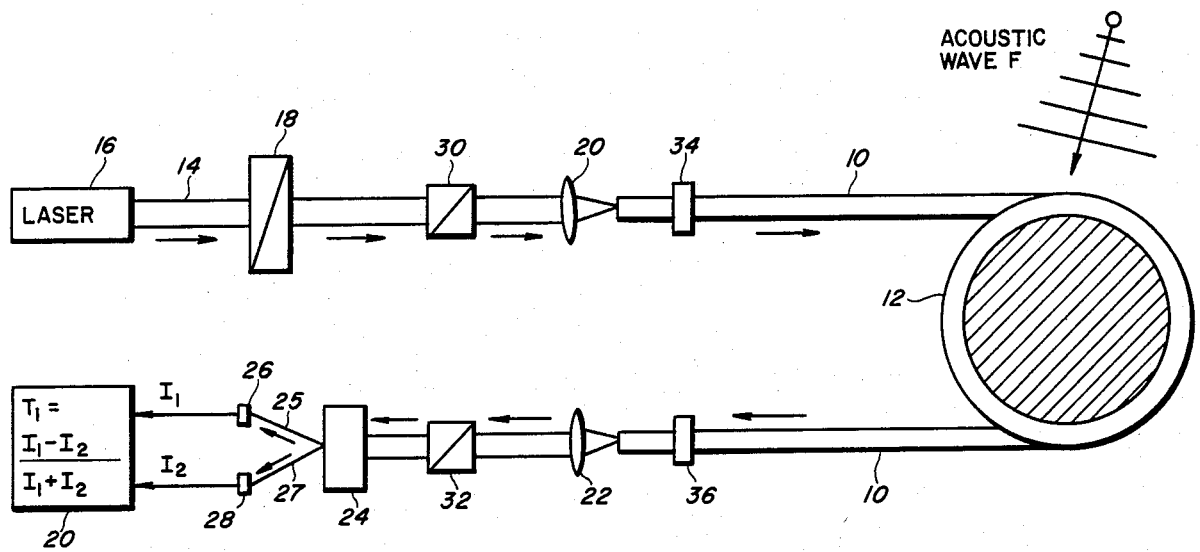
FIG. 2 illustrates a single fiber optical sensor for detecting a physical quantity.
Figure 3:
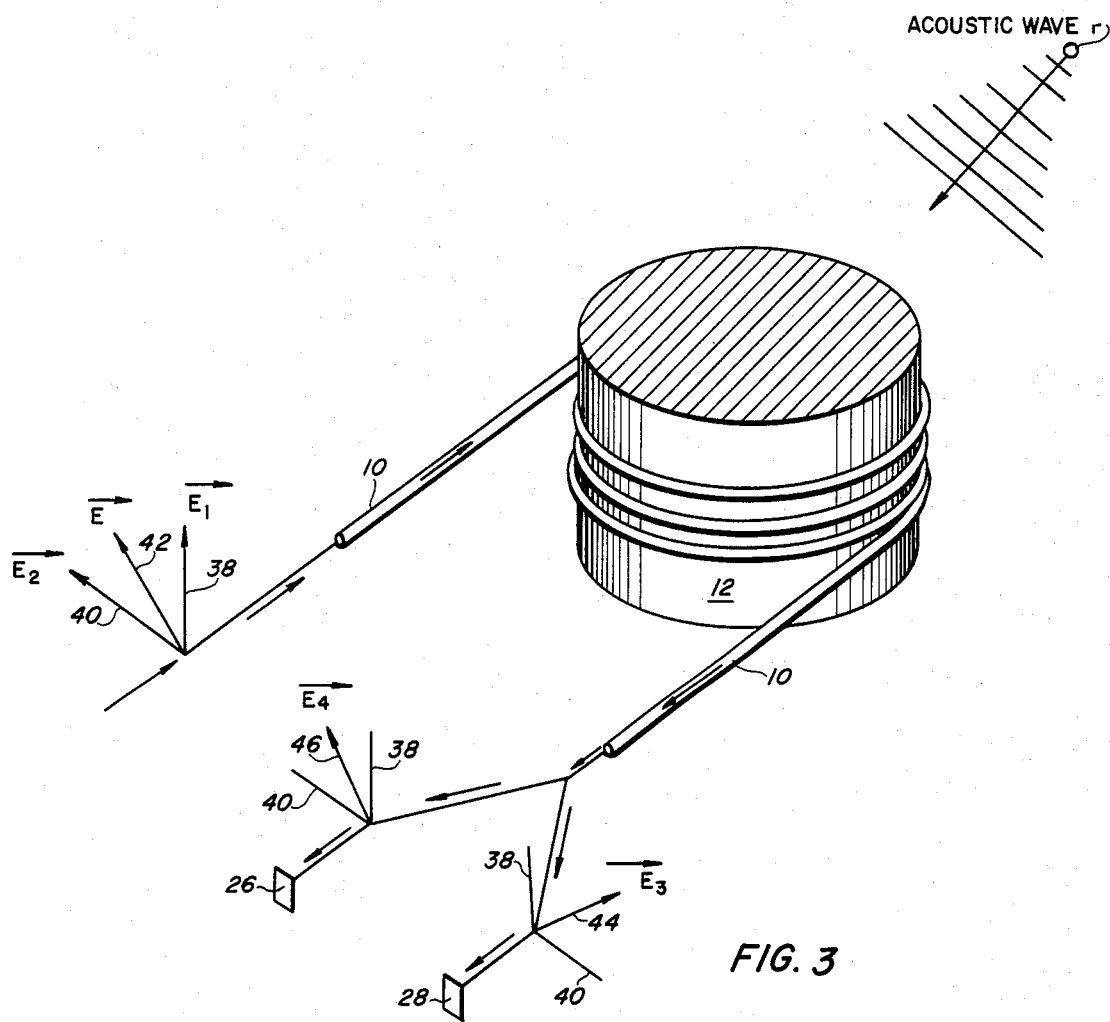
FIG. 3 schematically illustrates the principle of operation of the sensor shown in FIG. 2.

FIGS. 2 and 3 illustrate a single fiber sensor based on the above discussed theory which is disclosed in U.S. patent application Ser. No. 293,589, titled "A Sensitive Fiber Optic Sensor", filed by the present Inventor on Aug. 7, 1981. The contents of this Application are herein incorporated by reference. As the present Inventions is an improvement on the sensor shown in FIGS. 2 and 3, this sensor will be described briefly herein as an aid to understanding the present Invention.

The sensor shown in FIG. 2 is an acoustic sensor wherein a len9th of single monomode optical fiber 10 is helically wound about a cylinder or mandrel 12 (which defines a carrier) formed of resilient material, such as rubber, so as to be compliant to the pressures of an acoustic wave F. Light 14 from a laser 16 is coupled through a linear polarizer 18 and focused by a lens 20 into the core of the optical fiber 10. The light is coupled out of the fiber by a lens 22 and passed to a Wollaston prism 24 where it is split into two mutually orthogonal linearly polarized components 25 and 27. These components are incident upon respective photodetectors 26 and 28 and their photocurrents $I_1$ and $I_2$ are processed electronically at 20 to produce a signal proportional to $T_1 = (I_1 - I_2)/(I_1 + I_2)$. Polarization changing devices 30 and 32 (e.g. Soleil-Babinet compensators) may be employed at the fiber input and output, respectively, to insure that the state of polarization is correct in the fiber as it propagates around mandrel 12 and arrives at Wollaston prism 24. The necessary polarization changes may be accomplished instead with suitably oriented fiber squeezers 34 and 36 applied at the inlet and outlet, respectively, of fiber 10.

When an acoustic pressure wave represented by $F = F \sin \omega_s t$ is incident upon mandrel 12, with optimum adjustments of the polarizing components, the detected signal is given by the formula $T_1 = (I_1 - I_2)/(I_1 + I_2) = -\sin(aF \sin \omega_s t)$, where a is a factor representing the coupling efficiency between the acoustic wave of the pressure amplitude F on the fiber, $\omega_s$ is the angular frequency of the acoustic wave, and t represents time. Processing $T_1$ electronically gives a signal $T = \arcsin T_1 = aF \sin \omega_s t$. That is $T_1$ has the same frequency as the acoustic pressure wave, and its amplitude is linearly related to the amplitude of the acoustic wave. Alternately, writing $T_1$ in expanded form as $T_1 = 2J_1(aF) \sin \omega_s t + 2J_3(aF) \sin 3\omega_s t + \ldots$, where $J_n$ is the n-th order Bessel function, shows that filtering the signal at the acoustic frequency $\omega_s$ results in the signal $T_1 = 2J_1(aF)$. For small values of aF, the detected signal is linearly related to the amplitude of the acoustic pressure F. Processing the photocurrents $I_1$ and $I_2$ in the normalized form $T_1 = (I_1 - I_2)/(I_1 + I_2)$ removes any intensity changes or noises caused by the laser source.

FIG. 3 schematically illustrates the principle of operation of the sensor of FIG. 2 wherein an acoustic wave is detected by the phase interference between two eigenmodes. $\vec{E}_1$ (38) and $\vec{E}_2$ (40) represent the transverse electric field vectors of the two eigenmodes of optical fiber 10. Input polarizer 18 and polarization changer 30 (or squeezer 34) are adjusted to launch light into the fiber so that it is polarized with its electric field vector $\vec{E}$ (42) at an angle of 45° to both $\vec{E}_1$ (38) and $\vec{E}_2$ (40). This insures that the two eigenmodes are equally excited. At the output of optical fiber 10, Wollaston prism 24 (illustrated in FIG. 2) is adjusted so that its linearly polarized output states $\vec{E}_3$ (44) and $\vec{E}_4$ (46) are at each at 45° to the transverse field vectors of the eigenmodes of optical fiber 10. Photodetectors 26 and 28 are provided for receiving $\vec{E}_3$ and $\vec{E}_4$ and processing them electronically to produce a signal proportional to $T_1 = (I_1 - I_2)/(I_1 + I_2)$ The compliant mandrel 12 is chosen to maximize both $\Delta l$ (fiber length change) and $\Delta \beta$ (total fiber birefringence change) for maximizing the acoustic induced phase change. Optical fiber 10 may be wound around the surface of compliant mandrel 12, as illustrated in FIGS. 2 and 3, or imbedded therein. Embedding the fiber in, or bonding it to, the mandrel is preferred as the total fiber birefringence change $\Delta \beta = \Delta \beta_b + \Delta \beta_{tc} + \Delta \beta_f$ is larger. $\Delta \beta_b + \Delta \beta_{tc}$ is the change in bending plus tension-coiling birefringence which results from a change in diameter of the mandrel. $\Delta \beta_f$ is the change in birefringence that occurs when the fiber is squashed transversely, and results when the mandrel changes its length under the action of the acoustic pressure. This $\Delta \beta_f$ occurs only if the fiber is embedded in, or bonded to, the mandrel. This $\Delta \beta_f$ is usually much larger than $\Delta \beta_b + \Delta \beta_{tc}$.

The sensor illustrated in FIGS. 2 and 3 may be suitably configured, as described in U.S. patent application Ser. No. 293,589 mentioned above, so as to maximize the device's sensitivity to the physical quantity to be measured and to minimize the device's sensitivity to environmentally induced perturbations. However, in any configuration, the device is incapable of detecting steady state or slowly varying conditions in the physical quantity to be detected. The present Invention provides a solution this problem.

Referring now to FIGS. 4 through 13, wherein like reference characters designate identical or corresponding parts throughout several views, the present Invention will be described in detail.

Figure 4:
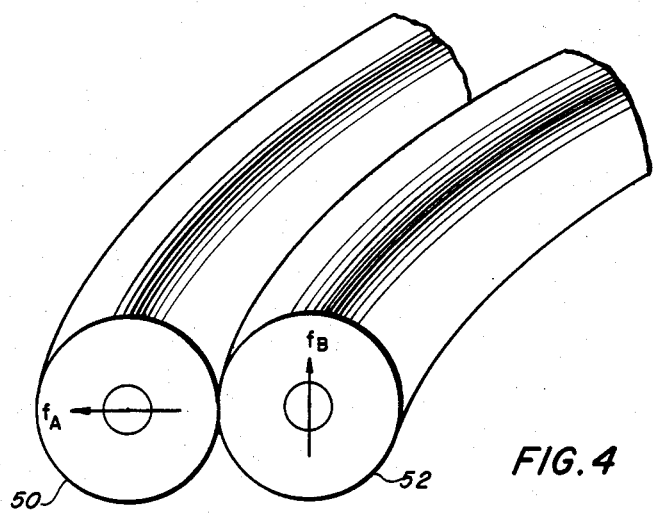
FIG. 4 illustrates the basic structure of a fiber optic sensor according to a preferred embodiment of the present Invention.

The basic structure of the DC sensors according to the present Invention is shown in FIG. 4. Two identical, intrinsically highly birefringent (polarization preserving) optical fibers 50 and 52 are positioned side by side with their fast axes $f_A$ and $f_B$, respectively, oriented perpendicular to each other. This pair of optical fibers forms the basic sensing unit of the DC sensor of the present Invention. As such, the two fibers 50 and 52 can be bonded together in this side by side arrangement prior to being placed in any of several different sensor configurations to be described below.

Figure 5:
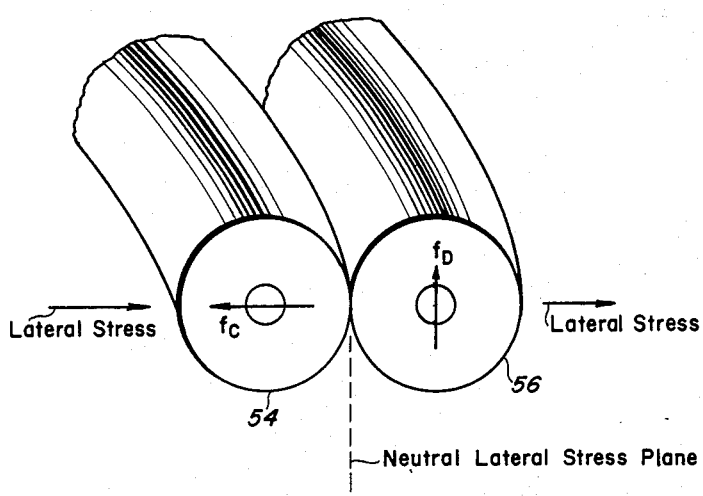
FIG. 5 illustrates the basic structure of a fiber optic sensor according to a preferred embodiment of the present Invention.

Rather than being intrinsically present in the fibers, the high birefringence can be artificially induced. For example, two normally isotropic fibers 54 and 56 can be bent or laterally stressed such that one fiber is in lateral tension (fiber 56) and the other is in lateral compression (fiber 54) as illustrated in FIG. 5. Again, the fast axes $f_C$ and $f_D$, respectively, are orthogonally oriented.

As shown in FIGS. 4 and 5, the only requirement for the optical fibers in the sensor of the present Invention is that both fibers must have equal birefringence and their fast axes must be orthogonal. Additionally, the two fibers must be immediately adjacent so that each is subjected to the same environment.

FIGS. 6 through 9 illustrate various sensor configurations which utilize the basic sensor optical fiber pair (fibers 50 and 52) shown in FIG. 4. The fiber pair having artificially induced birefringence (fibers 54 and 56) shown in FIG. 5 can also be used.

Figure 6:
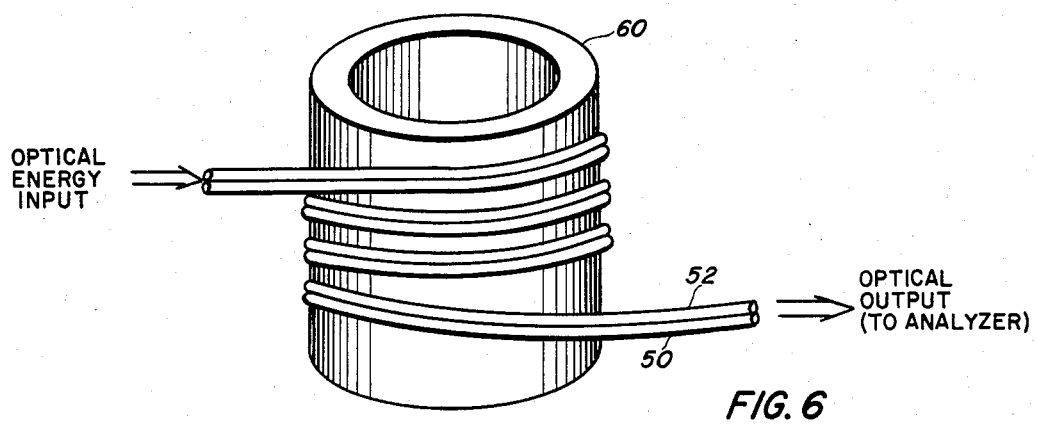
FIG. 6 illustrates a pressure or magnetic field sensor device according to a preferred embodiment of the present Invention.

In FIG. 6, the fiber pair 50, 52 is coiled about and bonded to or embedded in a compliant carrier, such as cylinder 60. The cylinder 60 may be made of acoustically compliant material, magnetostrictive material, or other such material which will result in a change in the radius of the cylinder 60 in response to an applied physical field to be measured. The changes in the radius of the cylinder result in asymmetrical changes in the stress applied to each of the fibers 50, 52 in the sensor pair resulting in detectable changes in the optical energy passing through the fibers. The sensor may be used to detect acoustic fields, magnetic fields, temperature changes, etc.

Figure 7:
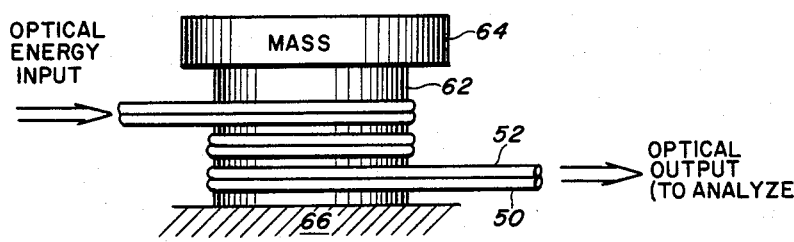
FIG. 7 illustrates an acceleration sensor device according to a preferred embodiment of the present Invention.

Similarly, in FIG. 7 an acceleration sensor is illustrated. In this sensor the fiber pair 50, 52 is wrapped about and bonded to or embedded in a compliant carrier, such as cylinder 62, which is attached to a fixture 66 at one end. The other end of the cylinder 62 is affixed to a mass 64 which distorts the cylinder in response to applied accelerations. The distortions in the cylinder 62 supply asymmetrical stress to the fibers thereby producing detectable changes in optical energy passing through the fibers.

Figures 8, 9:
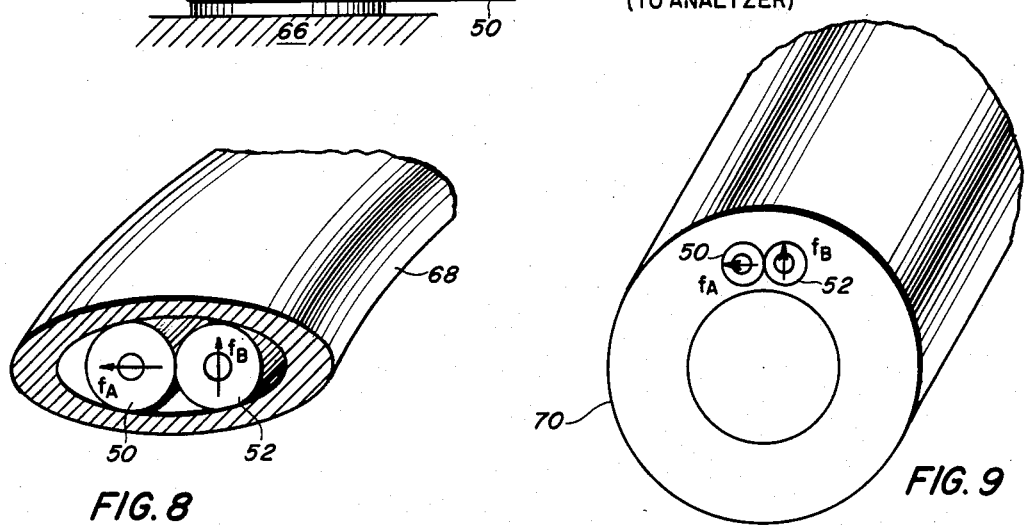
FIG. 8 illustrates an extended sensor device according to a preferred embodiment of the present Invention.
FIG. 9 illustrates an extended sensor device according to a preferred embodiment of the present Invention.

FIGS. 8 and 9 illustrate extended sensors. In FIG. 8, the fiber pair 50, 52 is enclosed within a suitably compliant (acoustic, magnetostrictive, etc.) elliptical jacket 68 which extends through a physical field to be detected. In FIG. 9, the fiber pair 50, 52 is embedded within the wall of a suitably compliant tube 70 through which a medium having the physical characteristic to be detected passes. The jacket 68 or the tube 70 are distorted in response to the physical quantity to be detected thereby producing optically detectable asymmetrical stress variations in the fiber pair 50, 52. Other sensors utilizing the fiber pair 50, 52 can be similarly formed as should be obvious to the skilled practitioner.

In each of the sensors illustrated in FIGS. 6 through 9, the physical quantity to be detected asymmetrically stresses the two fibers equally. As will be described in greater detail below, the induced stress changes the birefringence in the fibers 50, 52 making up the pair resulting in a rotation of the state of polarization in both fibers 50, 52 in the same direction. Any undesired environmental perturbations will symmetrically stress the fibers thereby changing the state of polarization of each fiber 50, 52 in different directions. Hence, by optically detecting the changes in the state of polarization and by subsequent electronic processing, the undesired environmentally induced changes subtract while the changes due to the physical quantity add. For identical fibers 50, 52, cancellation of the environmental instabilities will be complete thereby allowing the sensor to detect a physical quantity of any frequency regardless of the presence of environmental perturbations of any frequency.

Figure 10:
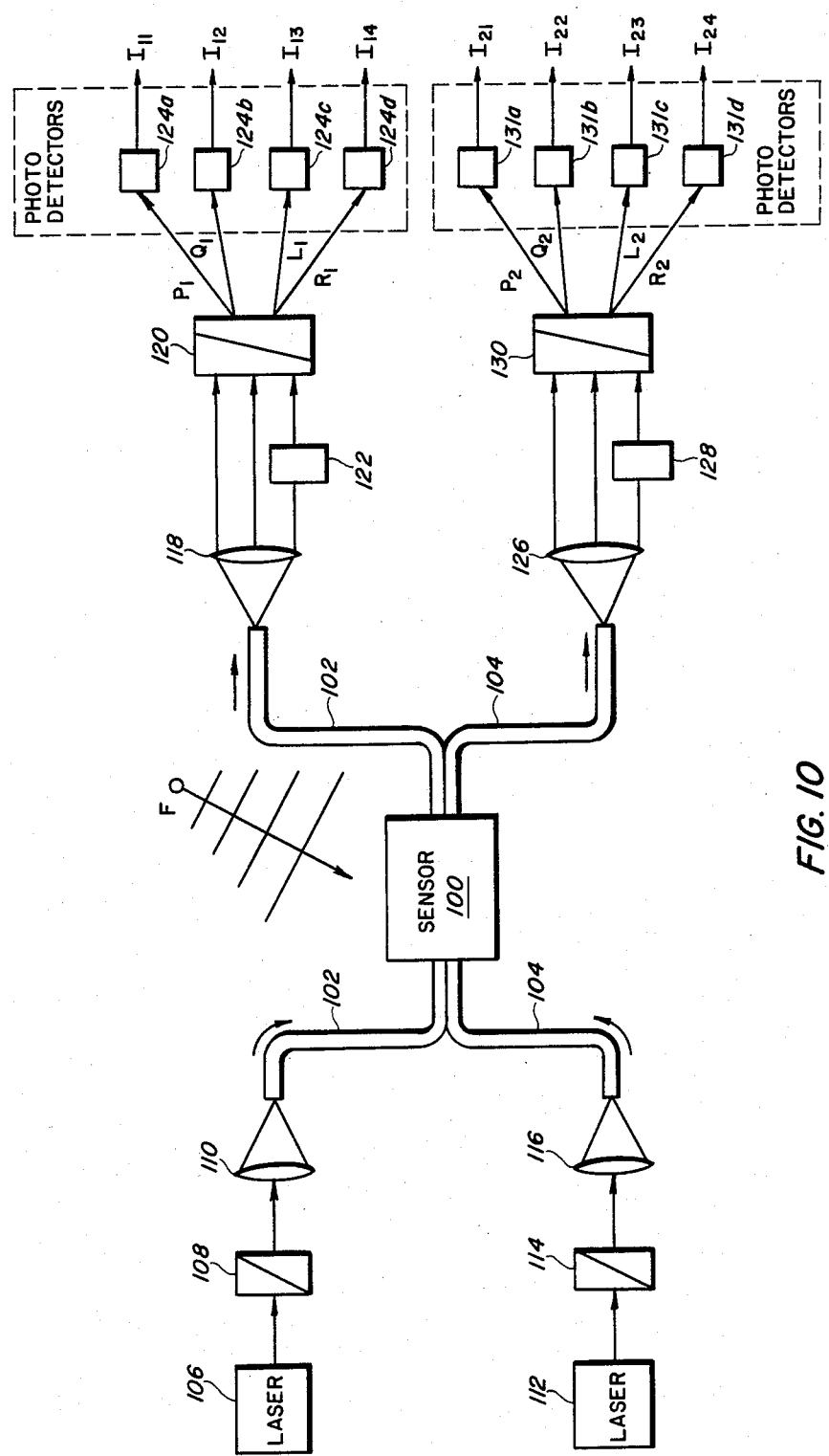
FIG. 10 illustrates a sensor system according to a preferred embodiment of the present Invention.
Figure 11:
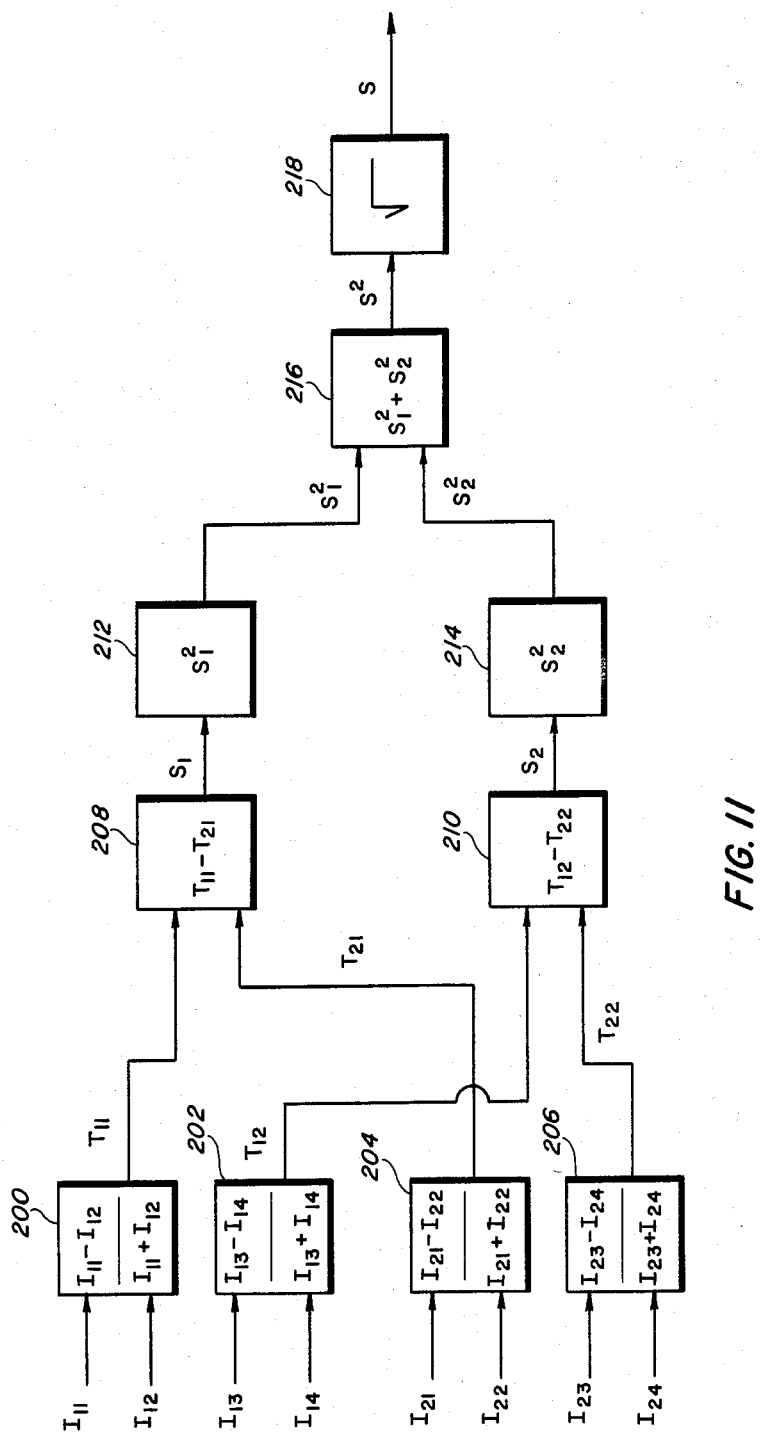
FIG. 11 illustrates an electronic processing system for use with the sensor system shown in FIG. 10.

Turning now to FIGS. 10 and 11, a complete sensor system according to the present Invention including a sensor and an optical/electronic analyser will be described.

In FIG. 10, a sensor 100 is subjected to a physical quantity F to be detected. The sensor 100 can be any of the sensors depicted in FIGS. 6 through 9 or their equivalent. The sensor 100 is coupled to a bonded pair of highly birefringent identical optical fibers 102 and 104 having orthogonally oriented fast axes. The fibers 102 and 104 may be intrinsically birefringent as described above with respect to FIG. 4 or artifically birefringent as described with respect to FIG. 5. The small portions of the fibers 102 and 104 external to the sensor 100 may be separated as shown for convenience in coupling optical energy in and out thereof, so long as each fiber is subjected to essentially the same environment.

Coherent light from a laser 106 is linearly polarized by a first linear polarizer 108 and focused by a lens 110 into the core of the first optical fiber 102. The first linear polarizer 108 is suitably oriented at 45° with respect to the fast and slow axes of the first fiber 102 so as to equally excite the two eigenmodes of the fiber 102, as described above with respect to FIGS. 2 and 3. Similarly, a second linear polarizer 114 is oriented to launch coherent light from a laser source 112 through a lens 116 into the core of the second fiber 104 at 45° with respect to the fast and slow axes of the fiber such that the two eigenmodes of the second fiber 104 are equally excited, as described above. As previously described, the fast axis of the first fiber 102 is oriented at 90° with respect to the fast axis of the second fiber 104. The two laser sources 106 and 112 can be replaced by a single laser source feeding a two-port 3 db directional coupler, as should be apparent to those of skill in the art. Although not illustrated, it should be understood that polarization changing devices or fiber squeezers may be utilized to orient the polarized light with respect to the fast and slow axes of the fibers 102 and 104.

The light output of the first fiber 102 is focused onto a first Wollaston prism 120 by means of a lens 118. The first Wollaston prism 120 is adjusted so that its linearly polarized orthogonal output states $P_1$ and $Q_1$ are at $\pm 45°$ ($\pi/4$) to the transverse field vectors of the eigenmodes of the first fiber 102. Light in the output state $P_1$ is directed onto a photodector 124a which produces an output signal $I_{11}$ proportional to the intensity of the light signal $P_1$. Similarly, a photodetector 124b converts the light in the output state $Q_1$ to an electrical signal $I_{12}$.

A portion of the light output of the first fiber 102 passes through a first quarter wave plate 122 before arriving at the first Wollaston prism 120. The first quarter wave plate is suitably adjusted such that the transverse field vectors of the light modes of the first fiber 102 are converted from linear to circular polarization. The circularly polarized light is then separated by the first Wollaston prism 120 into a left circularly polarized state $L_1$, which is detected to produce an intensity signal $I_{13}$ by photodetector 124c, and into a right circularly polarized state $R_1$, which is detected to produce an intensity signal $I_{14}$ by a photodetector 124d.

In a similar manner, the light output of the second fiber 104 is analyzed to produce intensity signals $I_{21}$ and $I_{22}$ representing the intensities of the light in the linearly polarized orthogonal output states $P_2$ and $Q_2$, respectively, and to produce intensity signals $I_{23}$ and $I_{24}$ representing the intensities of the light in the left and right circularly polarized states $L_2$ and $R_2$, respectively. The analysis is performed by means of a second lens 126, a second quarter wave plate 128, a second Wollaston prism 130, and by photodetectors 131a through 131d.

The electronic processing of the intensity signals $I_{11}$ through $I_{24}$ is illustrated in FIG. 11 and will be discussed at length below.

Figure 12:
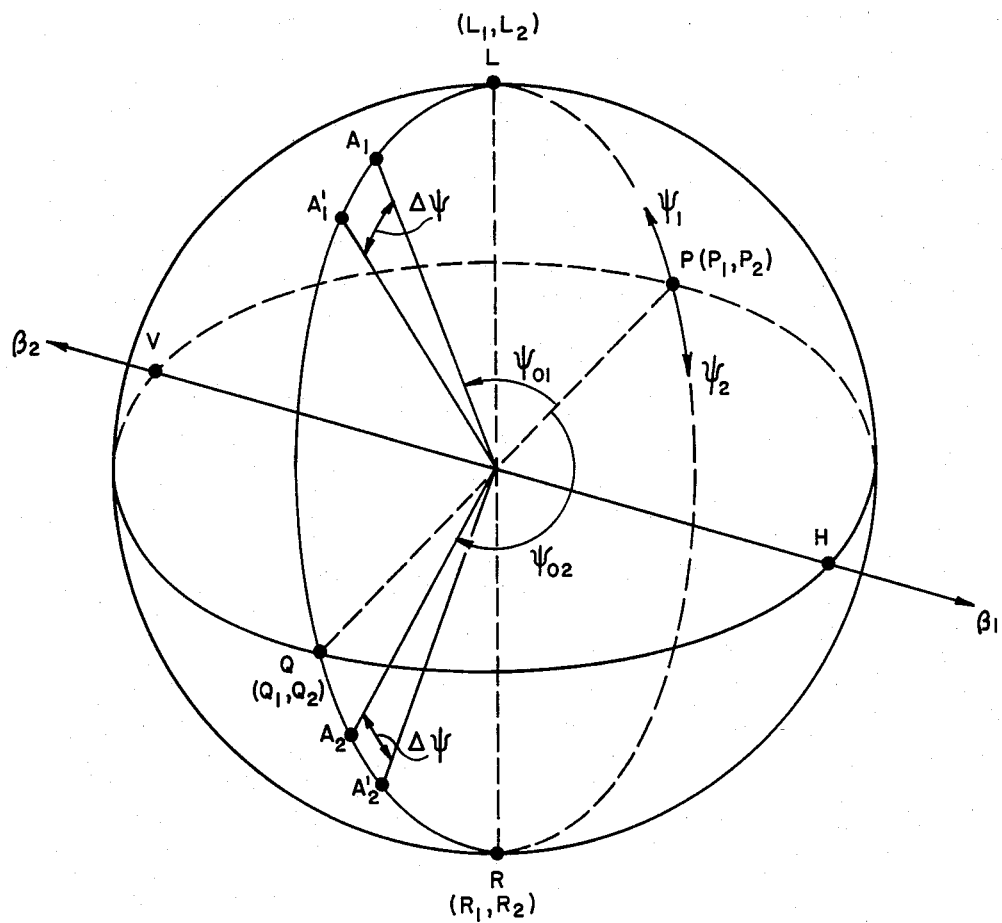
FIG. 12 is a POINCARÉ sphere polarization diagram illustrating the principles of operation of the present Invention.

The detailed operation of the sensor system can be described by employing the POINCARÉ sphere representation of polarization as shown in FIG. 12. On the sphere, linear polarization states are represented by the intersection of a horizontal plane passing through the center of the sphere and the spherical surface including the points P, H, Q, and V; i.e., the equator. The two circular polarization states are represented by the north and south poles of the sphere, that is, the points L and R. The remaining positions on the surface of the sphere represent elliptical polarization states. For purposes of illustration, the fast axis of the first fiber 102 is considered to be horizontal and the fast axis of the second fiber 104 is considered to be vertical. For this configuration, the rotation vector $\beta$ for each fiber passes through points V and H, but pointed in opposite directions. The points P and Q represent linear polarization at ±45° to the fast axis of the fiber (depending upon the fiber being considered) and the points L and R represent left and right circular polarization, respectively. It should be kept in mind that the exact orientation of the fast axes of the fibers are given here merely for purposes of illustration and that any other orientation may be used so long as the fast axes are orthogonal.

Considering the first fiber 102, since the fast axis is horizontal, the rotation vector $\beta_1$ is directed from points V to H. Hence, for a linearly-polarized input at $\pi/4$ to the eigenmodes (point P), the state of polarization rotates counter-clockwise in the great circle P, L, Q, R as it propagates along the fiber. The output state $A_1$ is given by $\psi_{01} = \beta_1 l_1$, where $\psi_{01}$ is the angle of rotation due to the fiber birefringence and $l_1$ is the fiber length. The angle $\psi_{01}$ will change when or if the environment changes. In general $\psi_{01} >> 2\pi$. The physical quantity to be detected changes the stress in the fiber and thus rotates the state of polarization through $\Delta\psi = \Delta(\beta_1 l_1)$ from $A_1$ to $A'_1$. Now, if two intensity detectors 124a and 124b are arranged to detect the light intensities in the linear polarization states $P_1$ and $Q_1$, respectively, as shown in FIG. 10, the following intensity signals are produced:

$$I_{11} = \cos^2[(\psi_{01} + \Delta\psi)/2] \quad (1)$$

$$I_{12} = \cos^2[\pi/2 - (\psi_{01} + \Delta\psi)/2] \quad (2)$$
$$= \sin^2[(\psi_{01} + \Delta\psi)/2]$$

Similarly, if two intensity detectors 124c and 124d are arranged to detect the light intensities in the circular polarization states $L_1$ and $R_1$, respectively, as shown in FIG. 10, the following intensity signals are produced:

$$I_{13} = \cos^2[(\psi_{01} + \Delta\psi)/2 - \pi/4] \quad (3)$$

$$I_{14} = \cos^2[(\psi_{01} + \Delta\psi)/2 + \pi/4] \quad (4)$$

Now, considering the second fiber 104, the fast axis is vertical, indicating that the rotation vector $\beta_2$ is directed from points H to V. Thus for the same linearly polarized input at point P ($\pi/4$ to the fiber eigenmodes), the state of polarization rotates clockwise in the great circle P, R, Q, L as it propagates along the fiber. The output state $A_2$ due to the fiber birefringence is given by $\psi_{02} = \beta_2 l_2 >> 2\pi$, where $l_2$ is the length of the fiber. Again, $\psi_{02}$ will change if the environment changes. As with the first fiber 102, the physical quantity to be detected rotates the state of polarization counter-clockwise from $A_2$ through $\Delta\psi = \Delta(\beta_2 l_2)$ to $A'_2$. This is because the sensor construction guarantees that the fast axes of the birefringence induced by the physical quantity are in the same direction in the two fibers. As shown in FIG. 10, the intensity detectors 131a and 131b detect the light intensities in the linearly polarized states $P_2$ and $Q_2$, respectively, and the intensity detectors 131c and 131d detect the light intensities in the circularly polarized states $L_2$ and $R_2$, respectively. The following intensity signals are produced by the detectors 131a through 131d:

$$I_{21} = \cos^2[(\psi_{02} - \Delta\psi)/2] \quad (5)$$

$$I_{22} = \cos^2[\pi/2 - (\psi_{02} - \Delta\psi)/2] \quad (6)$$
$$= \sin^2[(\psi_{02} - \Delta\psi)/2]$$

$$I_{23} = \cos^2[(\psi_{02} - \Delta\psi)/2 - \pi/4] \quad (7)$$

$$I_{24} = \cos^2[(\psi_{02} - \Delta\psi)/2 + \pi/4] \quad (8)$$

In the sensor system shown in FIG. 10, the first and second fibers 102 and 104 are equal in length and identical in composition. Thus the lengths $l_1$ and $l_2$ are equal. Since both fibers have the same birefringence, $|\beta_1| = |\beta_2|$. Also, they are subjected to the same environmental perturbations. Therefore it follows that $\psi_{01} = \psi_{02} = \psi_0$ in equations 1 through 8 presented above.

FIG. 11 illustrates an electronic system for processing the intensity signals $I_{11}$ through $I_{24}$ to obtain an output signal representative of the physical quantity to be detected. The intensity signals are first normalized by a plurality of commercially available ratiometer circuits 200, 202, 204, and 206. The normalization is performed by polarization type (linear or circular) and by optical fiber. The following normalized signals are produced $$T_{11} = \frac{I_{11} - I_{12}}{I_{11} + I_{12}} = \cos(\psi_0 + \Delta\psi) \quad (9)$$

$$T_{12} = \frac{I_{13} - I_{14}}{I_{13} + I_{14}} = \sin(\psi_0 + \Delta\psi) \quad (10)$$

$$T_{21} = \frac{I_{21} - I_{22}}{I_{21} + I_{22}} = \cos(\psi_0 - \Delta\psi) \quad (11)$$

$$T_{22} = \frac{I_{23} - I_{24}}{I_{23} + I_{24}} = \sin(\psi_0 - \Delta\psi) \quad (12)$$

Normalization is preferably performed to remove any dependence of the processed signals on incident laser power. Thus errors due to power variations in the laser inputs to the two fibers are eliminated.

The normalized linearly polarized intensity signals for the two fibers $T_{11}$ and $T_{21}$ are combined in a subtraction circuit 208 as follows:

$$S_1 = T_{11} - T_{21} = -2\sin\psi_0 \sin\Delta\psi \quad (13)$$

Similarly, the normalized circularly polarized intensity signals for the two fibers $T_{12}$ and $T_{22}$ are combined in a subtraction circuit 210 as follows:

$$S_2 = T_{12} - T_{22} = 2\cos\psi_0 \sin\Delta\psi \quad (14)$$

The two combined signals $S_1$ and $S_2$ are squared by squaring circuits 212 and 214, respectively, and the resultant signals $S_1^2$ and $S_2^2$ are combined in an adder circuit 216 as follows:

$$S^2 = S_1^2 + S_2^2 = 4\sin^2\Delta\psi[\sin^2\psi_0 + \cos^2\psi_0] \quad (15)$$

$$= 4\sin^2\Delta\psi$$

The signal $S^2$ given in equation 15 is processed by a square root circuit 218 to produce an output signal S as follows:

$$S = 2\sin\Delta\psi \qquad (16)$$

$$S \propto 2\Delta\psi$$

Hence, from equation 16, the output signal is directly proportional to the polarization change induced by the physical quantity of interest. This is independent of $\psi_0$ and hence of any environmentally induced change in $\psi_0$.

The electronic processing illustrated in block diagram form in FIG. 11 may be easily implemented using commonly available electronic circuitry such as multifunction integrated circuits as should be well known to the skilled reader. Alternatively, the intensity signals could be sampled and digitally processed or the entire processing function could be implemented via a computer.

Figure 13:
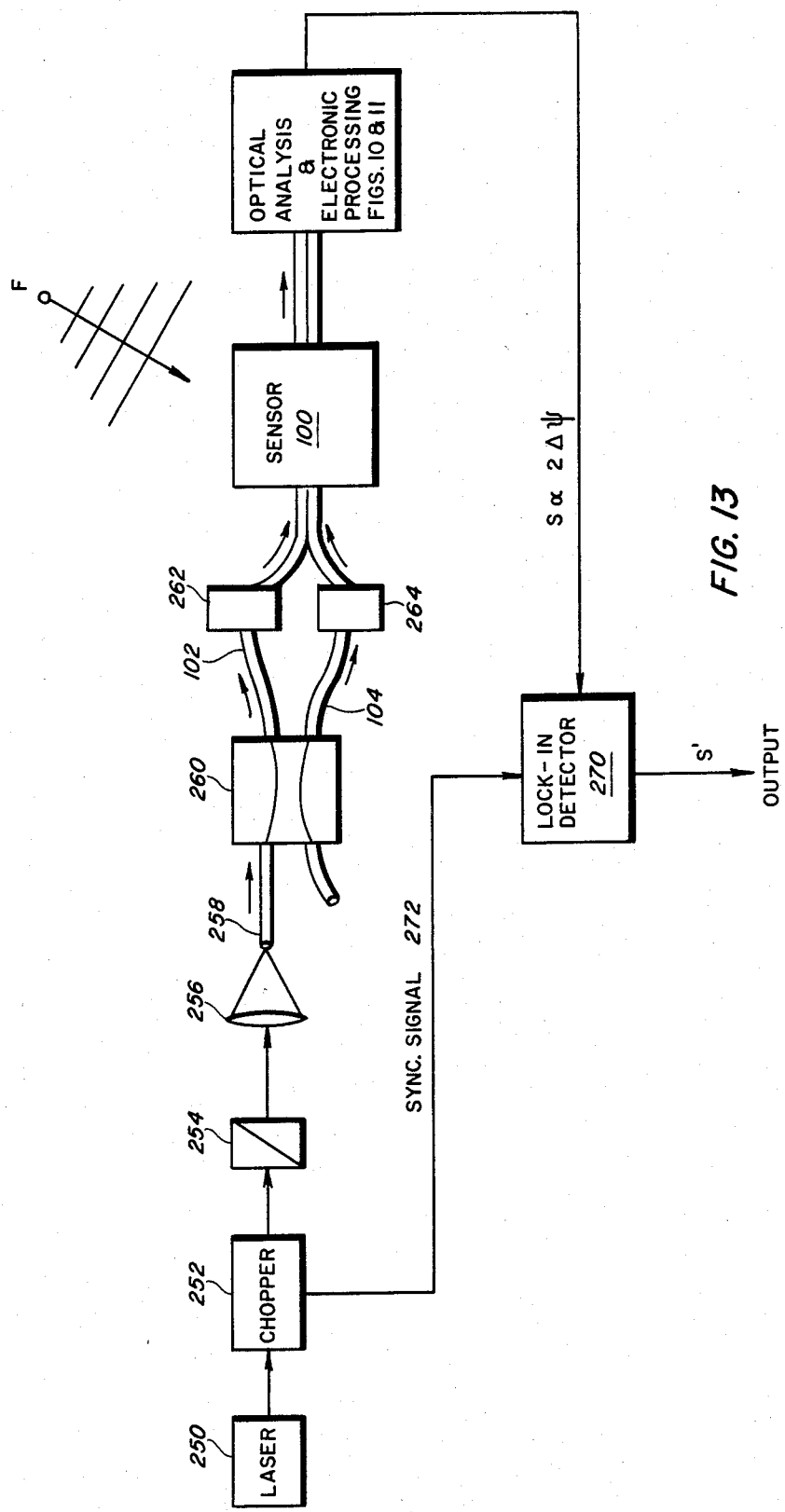
FIG. 13 illustrates a method for enhancing the signal-to-noise ratio of the sensor system according to the present Invention.

FIG. 13 illustrates an alternative embodiment of the present Invention wherein phase sensitive detection is used to increase the signal-to-noise ratio. A laser 250 supplies coherent light to an optical chopper 252 which interrupts the light signal at a given rate, which may be between 1 and 10 KHz. The chopper 252 may be a simple mechanical light shutter or an electro-optical device such as a Pockels cell. The interrupted light signal is linearly polarized by a linear polarizer 254 and focused into an optical fiber 258 by means if a lens 256.

The light signal traveling in the fiber 258 is divided into two signals by means of a 3 db optical coupler 260 acting as a beam splitter, and the two signals are suppled to the two highly birefringent orthogonal fibers 102 and 104, respectively, as described above. Fiber squeezers 262 and 264, respectively, attached to the fibers 102 and 104 are adjusted to orient the polarization of the light signals traveling in the fibers such that the eigenmodes of each fiber are equally excited, as described above.

The fibers are stressed in the sensor 100 in response to a physical quantity F and the light signals in the various polarization states are detected and electronically processed, as described above with respect to FIGS. 10 and 11, to produce an output signal S proportional to the physical quantity F. The signal S is coupled to a lock-in detector 270 which performs phase sensitive detection on the signal via a synchronized signal 272 suppled by the chopper 252. The output signal S' of the lock-in detector 270 is essentially similar to the signal S, but exhibits a much improved signal-to-noise ratio. Other appropriate phase sensitive detectors may be used in place of the lock-in detector 270, as should be apparent to the skilled reader.

The 3 db optical coupler 260 is preferably an all fiber coupler of a type known as a "bottle" coupler which couples signals traveling in optical fibers by means of evanescent wave coupling. Such a "bottle" coupler is the subject of U.S. Pat. No. 4,264,126 and U.S. application Ser. No. 217,338 filed by S. K. SHEEM on Dec. 17, 1980. Additionally this device is described in S. K. SHEEM and T. G. GIALLORENZI, "Single-Mode Fiber-Optical Power Divider: Escapsulated Etching Technique", Optics Letters, Vol. 4, No. 1, Jan. 1979, pages 29-31. The teachings of these documents are specificantly incorporated herein by reference. Other optical coupling means can also be utilized as should be apparant to the skilled reader.

Although sensors utilizing highly linearly birefringent optical fibers have been described above, the present Invention should not be considered to be limited to this type of fiber. For example, an analogous situation using two circularly birefringent fibers is also valid. The fibers may be inherently circularly birefringent by means of crystal cores or they may be made artificially birefringent by suitably twisting the fibers. The sensors are formed by bonding together a left circular fiber with a right circular fiber in the manner illustrated in FIGS. 6 through 9. This sensor may be substituted for the sensor 100 in the sensor systems shown in FIGS. 10, 11, and 13. The linear polarizers 108 and 114 in FIG. 10 must be reoriented (to 45°) such that the eigenmodes of the fibers are equally exicted. This may be equivalently accomplished by readJusting the fiber squeezers 262 and 264 in the embodiment shown in FIG. 13. In each embodiment, the quarter wave plates 122 and 128 must be replaced with suitably oriented half wave plates and the Wollaston prisms 120 and 130 must be readJusted to provide detection of light signals in the appropriate polarization states. In this situation, the rotation vectors would lie along the line connecting the points L and R in the Poincaré sphere representation shown in FIG. 12. The detected light signals are located at points V and H and at points P and Q.

The fiber optic sensor systems described above according to the present Invention are capable of detecting a physical quantity at any frequency including DC (zero frequency) and are completely independent of environmental perturbations. The advantages of being able to exploit the very high sensitivity of fiber optic sensors at zero frequency are numerous. For example, many physical quantities of interest do not change in an oscillatory manner. The sensors operate passively and no active control (feedback) is necessary. Also, the sensors operate automatically at maximum sensitivity because they are automatically in quandrature.

Obviously, numerous (additional) modifications and variations of the present Invention are possible in light of the above teachings. It is therefore to be understood that within the scope of the appended claims, the Invention may be practiced otherwise than as specifically described herein.

What is claimed as new and desired to be secured by Letters Patent of the United States is:

1. A physical sensor for detecting a physical quantity varying at any rate below a maximum rate with minimal disturbance from environmentally induced perturbations, comprising:

a first highly birefringent optical fiber having orthogonal fast and slow axes, a first coherent light signal passing through said first fiber;

a second highly birefringent optical fiber having orthogonal fast and slow axes, a second coherent light signal passing through said second fiber, said first and second fibers being equally birefringent, said second fiber being positioned longitudinally adjacent to said first fiber, said fast axis of said first fiber being orthogonal to said fast axis of said second fiber;

coupling means mechanically coupled to said first and second fibers for asymmetrically altering the birefringence of said first and second fibers in response to said physical quantity and for rotating the states of polarization of said first and second light signals in the same direction in response to said physical quantity, said birefringence of said first and second fibers being symmetrically altered in response to environmental perturbations such that the states of polarization of said first and second light signals are rotated in opposite directions in response to said environmental perturbations; and detection means for detecting the states of polarization of said first and second light signals, for combining said detected states of polarization altered due to said physical quantity, for cancelling said detected states of polarization altered due to environmental perturbations, and for producing an output signal representative of said physical quantity.

2. The physical sensor as recited in claim 1, wherein said coupling means comprises:

a pressure compliant cylindrical member, said first and second fibers being wound about the exterior surface of said cylindrical member and bonded thereto, the radius of said compliant cylindrical member changing in response to said physical quantity, said changes in the radius of said cylindrical member stressing said first and second fibers in response to said physical quantity;

whereby said birefringence of said first and second fibers is asymmetrically altered in response to said physical quantity.

3. The physical sensor as recited in claim 2, wherein said first and second fibers are embedded in said exterior surface of said cylindrical member and bonded thereto.

4. The physical sensor as recited in claim 1, wherein said coupling means comprises:

a cylindrical member formed of magnetostrictive material, said first and second fibers being wound about the exterior surface of said cylindrical member and bonded thereto, the radius of said cylindrical member being changed in response to said physical quantity due to the magnetostrictive effect, said changes in the radius of said cylindrical member stressing said first and second fibers in response to said physical quantity;

whereby said birefringence of said first and second fibers is asymmetrically altered in response to said physical quantity.

5. The physical sensor as recited in claim 4, wherein said first and second fibers are embedded in said exterior surface of said cylindrical member and bonded thereto.

6. The physical sensor as recited in claim 1, wherein said coupling means comprises:

a compliant cylindrical member including an exterior surface and first and second ends, said first end being affixed to a fixed member, said first and second fibers being wound about said exterior surface and bonded thereto; and a movable massive member affixed to said second end of said cylindrical member, said massive member moving in response to said physical quantity thereby distorting said cylindrical member, the distortions in said cylindrical member stressing said first and second fibers;

whereby said birefringence of said first and second fibers is asymmetrical altered in response to said physical quantity.

7. The physical sensor as recited in claim 6, wherein said first and second fibers are embedded in said exterior surface of said cylindrical member and bonded thereto.

8. The physical sensor as recited in claim 1, wherein said coupling means comprises:

an elliptical jacket including a longitudinal axis extending parallel to said first and second fibers, said jacket surrounding and contacting said first and second fibers, said jacket acting to stress said fibers in response to said physical quantity;

whereby said birefringence of said first and second fibers is asymmetrically altered in response to said physical quantity.

9. The physical sensor as recited in claim 8, wherein said elliptical jacket is formed of pressure compliant material, said jacket being distorted in response to said physical quantity.

10. The physical sensor as recited in claim 8, wherein said elliptical jacket is formed of magnetostrictive material, said jacket being distorted in response to said physical quantity due to the magnetostrictive effect.

11. The physical sensor as recited in claim 1, which further comprises:

source means for supplying said first coherent light signal to said first fiber and for supplying said second coherent light signal to said second fiber.

12. The physical sensor as recited in claim 11, wherein said source means comprises:

first laser source means for supplying said first coherent light signal;

first linear polarizer means for receiving said first light signal, for linearly polarizing said first light signal at an angle of 45 degrees with respect to said fast and slow axes of said first fiber, and for launching said first light signal into an input end of said first fiber;

second laser source means for supplying said second coherent light signal; and second linear polarizer means for receiving said second light signal, for linearly polarizing said second light signal at an angle of 45 degrees with respect to said fast and slow axes of said second fiber, and for launching said second light signal into an input end of said second fiber.

13. The physical sensor as recited in claim 1, wherein said detection means comprises:

first analyser means coupled to receive said first light signal emanating from an output end of said first fiber for splitting a portion of said first light signal into first and second orthogonal linearly polarized light beams which are each at 45 degrees with respect to said fast and slow axes of said first fiber;

first optical phase shift means coupled to receive said first light signal emanating from said output end of said first fiber for converting linearly polarized components of a portion of said first light signal into circularly polarized components;

second analyser means coupled to receiver said circularly polarized components of said first light signal from said first phase shift means for splitting said circularly polarized components into third and forth light beams, said third beam being right circularly polarized and said forth beam being left circularly polarized;

third analyser means coupled to receive said second light signal emanating from an output end of said second fiber for splitting a portion of said second light signal into fifth and sixth orthogonal linearly polarized light beams which are each at 45 degrees with respect to said fast and slow axes of said second fiber;

second optical phase shift means coupled to receive said second light signal emanating from said output end of said second fiber for converting linearly polarized components of a portion of said second light signal into circularly polarized components;

forth analyser means coupled to receive said circularly polarized components of said second light signal from said second phase shift means for splitting said circularly polarized components into seventh and eighth light beams, said seventh beam being right circularly polarized and said eighth beam being left circularly polarized; and photo-electric analyser means for detecting the intensities of said first through eighth light beams and for combining said intensities to produce said output signal representative of said physical quantity, 14. The physical sensor as recited in claim 12, wherein said detection means comprises:

first analyser means coupled to receive said first light signal emanating from an output end of said first fiber for splitting a portion of said first light signal into first and second orthogonal linearly polarized light beams which are each at 45 degrees with respect to said fast and slow axes of said first fiber;

first optical phase shift means coupled to receive said first light signal emanating from said output end of said first fiber for converting linearly polarized components of a portion of said first light signal into circularly polarized components;

second analyser means coupled to receiver said circularly polarized components of said first light signal from said first phase shift means for splitting said circularly polarized componets into third and forth light beams, said third beam being right circularly polarized and said forth beam being left circularly polarized;

third analyser means coupled to receive said second light signal emanating from an output end of said second fiber for splitting a portion of said second light signal into fifth and sixth orthogonal linearly polarized light beams which are each at 45 degrees with respect to said fast and slow axes of said second fiber;

second optical phase shift means coupled to receive said second light signal emanating from said output end of said second fiber for converting linearly polarized components of a portion of said second light signal into circularly polarized components;

forth analyser means coupled to receive said circularly polarized components of said second light signal from said second phase shift means for splitting said circularly polarized components into seventh and eighth light beams, said seventh beam being right circularly polarized and said eighth beam being left circularly polarized; and photo-electric analyser means for detecting the intensities of said first through eighth light beams and for combining said intensities to produce said output signal representative of said physical quantity.

15. A physical sensor for detecting a physical quantity varying at any rate below a maximum rate with minimum disturbance from environmentally induced perturbations, comprising:

source means for suppling a first coherent light signal and a second coherent light signal, said first and second light signals being lineraly polarized;

a first highly birefringent optical fiber having orthogonal fast and slow axes, said first light signal being launched into an input end of said first fiber, said first light signal being oriented with respect to said first fiber such that it is linearly polarized at an angle of 45 degrees to each of the fast and slow axes of said first fiber;

a second highly birefringent optical fiber having orthogonal fast and slow axes, said first and second fibers being equally birefringent, said second fiber being positioned longitudinally adjacent to said first fiber, said fast axis of said first fiber being orthogonal to said fast axis of said second fiber, said second light signal being launched into an input end of said second fiber, said second light signal being oriented with respect to said second fiber such that it is linearly polarized at an angle of 45 degrees to each of the fast and slow axes of said second fiber;

coupling means mechanically coupled to said first and second fibers for asymmetrically altering the birefringence of said first and second fibers in response to said physical quantity and for rotating the states of polarization of said first and second light signals in the same direction in response to said physical quantity, said birefringence of said first and second fibers being symmetrically altered in response to environmental perturbations such that the states of polarization of said first and second light signals are rotated in opposite directions in response to said environmental perturbations; and detection means for detecting the states of polarization of said first and second light signals, for combining said detected states of polarization altered due to said physical quantity, for cancelling said detected states of polarization altered due to said environmental perturbations, and for producing an output signal representative of said physical quantity.

16. The physical sensor as recited in claim 14, wherein said source means comprises:

first laser source means for supplying said first coherent light signal;

first linear polarizer means for receiving said first light signal, for linearly polarizing said first light signal at an angle of 45 degrees with respect to said fast and slow axes of said first fiber, and for launching said first light signal into an input end of said first fiber;

second laser source means for supplying said second coherent light signal; and second linear polarizer means for receiving said second light signal, for linearly polarizing said second light signal at an angle of 45 degrees with respect to said fast and slow axes of said second fiber, and for launching said second light signal into an input end of said second fiber.

17. The physical sensor as recited in claim 16, wherein said detection means comprises:

first analyser means coupled to receive said first light signal emanating from an output end of said first fiber for splitting a portion of said first light signal into first and second orthogonal linearly polarized light beams which are each at 45 degrees with respect to said fast and slow axes of said first fiber;

first optical phase shift means coupled to receive said first light signal emanating from said output end of said first fiber for converting linearly polarized components of a portion of said first light signal into circularly polarized components;

second analyser means coupled to receiver said circularly polarized components of said first light signal from said first phase shift means for splitting said circularly polarized components into third and forth light beams, said third beam being right circularly polarized and said forth beam being left circularly polarized;

third analyser means coupled to receive said second light signal emanating from an output end of said second fiber for splitting a portion of said second light signal into fifth and sixth orthogonal linearly polarized light beams which are each at 45 degrees with respect to said fast and slow axes of said second fiber;

second optical phase shift means coupled to receive said second light signal emanating from said output end of said second fiber for converting linearly polarized components of a portion of said second light signal into circularly polarized components;

forth analyser means coupled to receive said circularly polarized components of said second light signal from said second phase shift means for splitting said circularly polarized components into seventh and eighth light beams, said seventh beam being right circularly polarized and said eighth beam being left circularly polarized; and photo-electric analyser means for detecting the intensities of said first through eighth light beams and for combining said intensities to produce said output signal representative of said physical quantity.

18. The physical sensor as recited in claim 1, which further comprises:

means for modulating said first and second light signals at a given frequency; and phase sensitive detector means coupled to receive the output of said detection means and coupled to receive a synchronization signal from said modulating means for detecting the output of said detector means in synchronism with said synchronization signal and for producing a processed output signal, said processed output signal exhibiting an improved signal-to-noise ratio with respect to said output of said detector means.

19. The physical sensor as recited in claim 15, which further comprises:

means for modulating said first and second light signals at a given frequency; and phase sensitive detector means coupled to receive the output of said detection means and coupled to receive a synchronization signal from said modulating means for detecting the output of said detector means in synchronism with said synchronization signal and for producing a processed output signal, said processed output signal exhibiting an improved signal-to-noise ratio with respect to said output of said detector means.

20. A method of detecting a physical quantity varying at any rate below a maximum rate with minimum disturbance from environmentally induced perturbations comprising the steps of:

providing first and second equally highly birefringent optical fibers, each fiber having orthogonally disposed fast and slow axes;

positioning said first fiber longitudinally adjacent said second fiber with the fast axis of said first fiber orthogonal to the fast axis of said second fiber;

launching a first linearly polarized coherent light signal into said first fiber and launching a second linearly polarized light signal into said second fiber;

allowing a physical quantity to asymmetrically stress said first and second fibers in response thereto so as to alter the birefringence of said first and second fibers, the states of polarization of said first and second light signals thereby being rotated in a common direction in response to said physical quantity, said first and second fibers being symmetrically stressed by environmental perturbations such that said states of polarization of said first and second signals are rotated in opposite directions in response to said environmental perturbations;

detecting said states of polarization of said first and second signals emanating from said first and second fibers; and combining said detected states of polarization of said first and second signals such that changes in said states of polarization due to said physical quantity are enhanced while changes in said states of polarization due to said environmental perturbations are cancelled.

21. The method for detecting a physical quantity as recited in claim 20, wherein said step of allowing said physical quantity to stress said first and second fibers comprises the steps of:

winding said first and second fibers about the exterior surface of a compliant member; and subjecting said compliant member to said physical quantity, the shape of said compliant member being altered by said physical quantity thereby stressing said first and second fibers.

22. The method for detecting a physical quantity as recited in claim 20, wherein said step of allowing said physical quantity to stress said first and second fibers comprises the steps of:

winding said first and second fibers about the exterior surface of a transducer member, said transducer member being formed of magnetostrictive material; and subjecting said transducer member to said physical quantity in the form of a magnetic field, the shape of said transducer member being altered by said physical quantity thereby stressing said first and second fibers.

23. The method for detecting a physical quantity as recited in claim 20, whereby said step of allowing said physical quantity to stress said first and second fibers comprises the steps of:

enclosing said first and second fibers in a compliant member, said compliant member having a longitudinal axis parallel to said first and second fibers; and subjecting said compliant member to said physical quantity, the shape of said compliant member being altered by said physical quantity thereby stressing said first and second fibers.

24. The method for detecting a physical quantity as recited in claim 20, wherein said step of launching said first and second light signals into said first and second fibers comprises the steps of:

providing first and second coherent light signals;

linearly polarizing said first and second light signals, said first light signal being linearly polarized at an angle of 45 degrees with respect to the fast and slow axes of said first fiber, said second light signal being linearly polarized at an angle of 45 degrees with respect to the fast and slow axes of said second fiber;

launching said first linearly polarized light signal into said first fiber; and launching said second linearly polarized light signal into said second fiber.

25. The method for detecting a physical quantity as recited in claim 20, wherein said step of detecting said states of polarization of said first and second signals comprises the steps of:

splitting a portion of said first light signal emanating from said first fiber into two beams of linearly polarized light which are each at 45 degrees with respect to said fast and slow axes of said first fiber;

splitting a portion of said second light signal emanating from said second fiber into two beams of linearly polarized light which are each at 45 degrees with respect to said fast and slow axes of said second fiber;

optically phase shifting a portion of said first light signal to convert linearly polarized components of said portion of said first signal into circularly polarized components;

splitting said circularly polarized components of said portion of said first signal into a left circularly polarized light beam and a right circularly polarized light beam;

optically phase shifting a portion of said second light signal to convert linearly polarized components of said portion of said second signal into circularly polarized components;

splitting said circularly polarized components of said portion of said second signal into a left circularly polarized light beam and a right circularly polarized light beam; and converting said linearly polarized and circularly polarized light beams into electrical signals representative of the intensities of these beams.

* * * * *